UNITED STATES PATENT OFFICE.

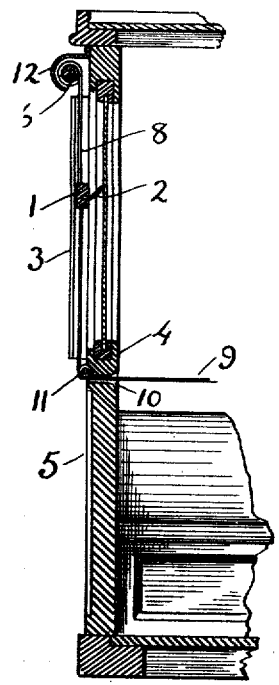
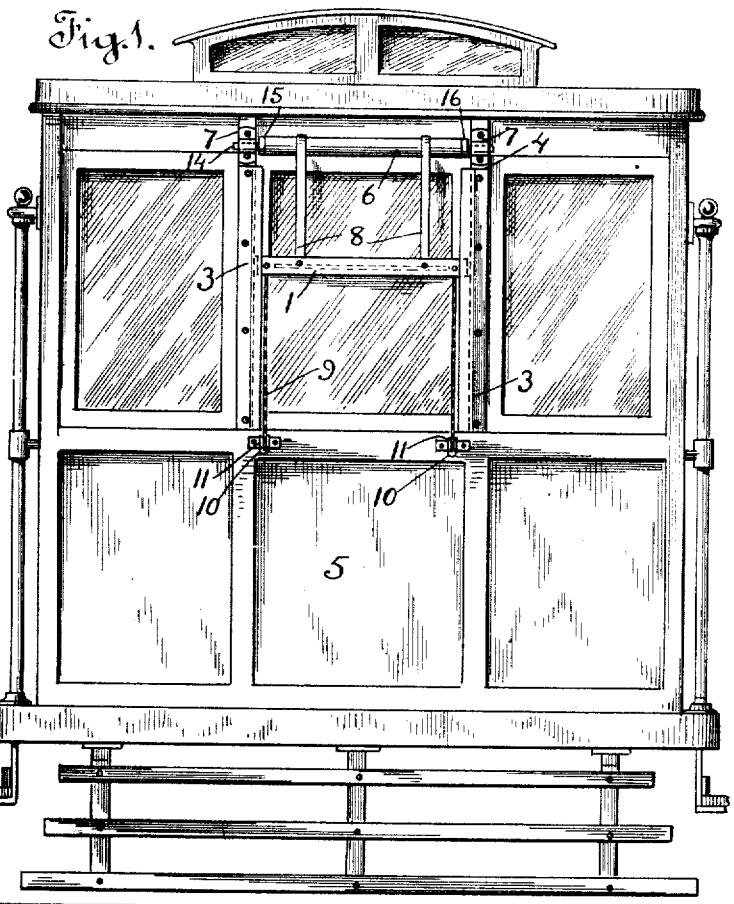
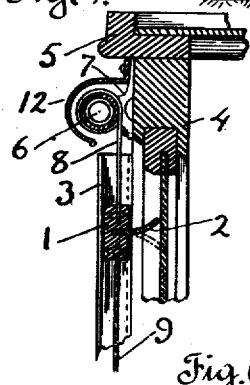
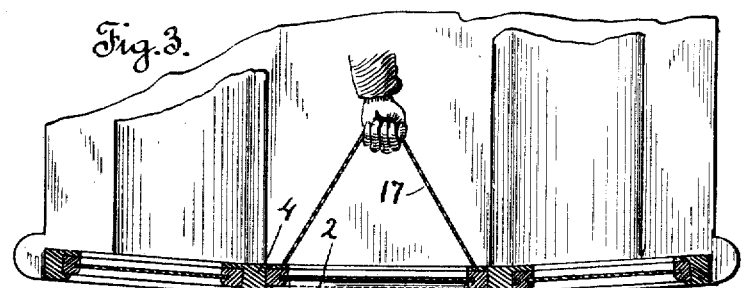
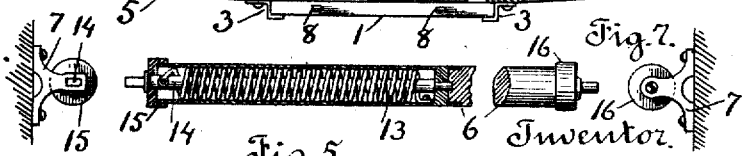

HIRAM G. VAUGHAN, OF SAN FRANCISCO, CALIFORNIA.

WINDOW-CLEANING DEVICE.

No. 916,635.  Specification of Letters Patent.  Patented March 30, 1909.

Application filed July 28, 1904. Serial No. 218,561.

*To all whom it may concern:*

Be it known that I, HIRAM G. VAUGHAN, a citizen of the United States of America, and a resident of the city and county of San Francisco, in the State of California, have invented a new and useful Window-Cleaning Device, of which the following is a specification, reference being had therein to the accompanying drawing.

This invention has relation to window cleaning devices, and it consists in the novel construction and arrangement of the parts as hereinafter shown and described.

The object of the invention is to provide a device of the character indicated, which is especially adapted to be used upon car windows and which may be easily and readily operated for the purpose of keeping such windows free from accumulated moisture, frost, etc., in order that the operator having charge of the car may have an unobstructed view of the track ahead.

The special object of the invention is to provide a device which will clean the window without any tendency to binding or hitching, and with this object in view the cleaner consists primarily of a bar having a rubber and which is arranged to move in guides located at the sides of the window. A single spring roller is located above the window and tapes are arranged to wind upon the said roller and are also connected with the bar. A draw cord is attached at its ends to said bar and passes under pulleys and through apertures provided in the front of the car, whereby its intermediate portion is within convenient reaching distance of the operator. By reason of the fact that all of the said tapes are mounted upon the same spring-actuated roller and not upon a plurality of such rollers as is sometimes the case, there is no chance for the said tapes to wind or unwind from the said roller in an uneven manner. Consequently, all tendency for the said bar to bind in its guides is eliminated. In moving vehicles of the character stated, it is essential that such cleaners move promptly and positively when operated, for otherwise if any of the parts of the cleaner should become caught or disarranged in cases of emergency, accidents of more or less seriousness may be the result.

In the accompanying drawings,—Figure 1 is a front elevation of a car provided with the window-cleaning device. Fig. 2 is a vertical sectional view of a front end of a car provided with the device. Fig. 3 is a horizontal sectional view of the front end of a car provided with the device. Fig. 4 is a transverse sectional view of the device. Fig. 5 is a side elevation of the spring roller with parts thereof in section. Fig. 6 is a view looking at one end of the roller, and Fig. 7 is a view looking at the opposite end of the roller.

The bar 1 is provided upon its inner side with the strip 2. Said strip may be of rubber or other flexible material. The guides 3, 3, are vertically arranged upon the sides 4 of the window, and receive the ends of the bar 1. The parts of the device are arranged at the end 5 of the car. The roller 6 is journaled for rotation in the brackets 7, 7, which are located at the top of the front 5 of the car. The tapes 8 are arranged to wind upon the roller 6 and are attached at their lower ends to the bar 1. The draw-cord 9 is attached at its ends to the bar 1, and passes under the pulley 11 and through the apertures 10 provided in the front 5 of the car. The hood 12 is attached to the upper portion of the front of the car 5 and lies over the roller 6 and forms a housing for the same. The roller 6 is provided in its interior with a coiled spring 13, which surrounds the shaft 14. One end of the said spring is made fast to the roller and the other end thereof is fixed to the shaft 14. The said shaft is journaled at its outer end portion in a cap 15, which forms a closure for the compartment in the roller 6 which contains the spring 13. The opposite end of said roller 6 is provided with a cap 16, and the intermediate portion 17 of the draw cord 9 affords means whereby the operator may grasp the said cord for the purpose of drawing the bar 1 and the strip 2 down along the outer surface of the window. The pintle of the cap 16 is circular and is journaled in one of the brackets 7, while the end of the shaft 14 is non-circular and is retained in a similar opening provided in the other bracket 7.

From the foregoing description it is obvious that as the draw cord 9 is pulled within the car the bar 1 and the strip 2 will descend along the window and that the tension of the spring 13 will be increased by reason of the fact that the tapes 8 are unwound from the roller 6. Consequently, when the draw cord 9 is released the spring 13 will rotate the roller 6 in the opposite direction and rewind the tapes 8 evenly upon the periphery of the roller 6. Inasmuch as several tapes 8 are used and there is but one spring-actuated roller upon which they all wind and from which they all unwind, there is no chance for one tape to unwind or wind upon the said roller more rapidly than all of the other tapes. Therefore, the bar 1 will always move in a true horizontal position and cannot cant or bind in the guides 3.

Having described my invention, what I claim as new and desire to secure by Letters-Patent, is:—

A window cleaning device comprising a bar, a flexible strip mounted upon the bar and having contact with the surface of the window, guides vertically located at the sides of the window and receiving the ends of said bar, a single spring-actuated roller journaled for rotation above the window, a protecting housing therefor, a plurality of tapes attached to said roller, the lower ends of said tapes being connected to the bar, pulleys journaled below the window, the window frame having apertures located below said pulleys, and a draw cord attached at its ends to the bar and passing under said pulley and through said apertures and having its intermediate portion located along the inner lower side of the window.

In testimony whereof I affix my signature in presence of two witnesses.

HIRAM G. VAUGHAN. [L. S.]

Witnesses:
HENRY P. TRICOU,
A. H. STE. MARIE.